US008533843B2

(12) United States Patent
Levi (10) Patent No.: US 8,533,843 B2
(45) Date of Patent: Sep. 10, 2013

(54) DEVICE, METHOD, AND PROGRAM PRODUCT FOR DETERMINING AN OVERALL BUSINESS SERVICE VULNERABILITY SCORE

(75) Inventor: Eliav Levi, Haifa (IL)

(73) Assignee: Hewlett-Packard Development Company, L. P., Houston, TX (US)

( * ) Notice: Subject to any disclaimer, the term of this patent is extended or adjusted under 35 U.S.C. 154(b) by 1029 days.

(21) Appl. No.: 12/250,199

(22) Filed: Oct. 13, 2008

(65) Prior Publication Data

US 2010/0095381 A1   Apr. 15, 2010

(51) Int. Cl.
*G06F 11/00* (2006.01)
*G06F 12/14* (2006.01)
*G06F 12/16* (2006.01)
*G06Q 10/00* (2012.01)
*G06Q 40/00* (2012.01)

(52) U.S. Cl.
USPC .......... 726/25; 705/7.28; 705/7.36; 705/7.38; 705/7.39

(58) Field of Classification Search
USPC ................... 726/25; 705/7.28, 18, 317–318, 705/325, 348; 703/13
See application file for complete search history.

(56) References Cited

U.S. PATENT DOCUMENTS

| 5,684,957 | A |  | 11/1997 | Kondo et al. |
| 5,699,403 | A |  | 12/1997 | Ronnen |
| 5,892,903 | A |  | 4/1999 | Klaus |
| 6,070,244 | A |  | 5/2000 | Orchier et al. |
| 6,202,060 | B1 |  | 3/2001 | Tran |
| 6,883,101 | B1 |  | 4/2005 | Fox et al. |
| 7,076,393 | B2 |  | 7/2006 | Ormazabal et al. |
| 7,146,305 | B2 |  | 12/2006 | Van der Made |
| 7,693,782 | B1 | * | 4/2010 | Stricker et al. .................. 705/38 |
| 7,930,228 | B1 | * | 4/2011 | Hawkins et al. ................ 705/35 |
| 7,958,494 | B2 | * | 6/2011 | Chaar et al. .................... 717/121 |
| 8,140,367 | B2 | * | 3/2012 | Bernardini et al. .......... 705/7.13 |
| 8,234,200 | B2 | * | 7/2012 | Grazlano et al. ............ 705/36 R |
| 8,307,444 | B1 | * | 11/2012 | Mayer et al. .................... 726/25 |
| 8,370,389 | B1 | * | 2/2013 | Dotan .......................... 707/784 |
| 2003/0097588 | A1 |  | 5/2003 | Fischman et al. |
| 2003/0126049 | A1 | * | 7/2003 | Nagan et al. .................... 705/35 |
| 2004/0054610 | A1 | * | 3/2004 | Amstutz et al. ................. 705/36 |
| 2005/0055308 | A1 | * | 3/2005 | Meyer et al. .................... 705/38 |

(Continued)

FOREIGN PATENT DOCUMENTS

EP       1768043  A3  *  7/2008

*Primary Examiner* — Krista Zele
*Assistant Examiner* — Tariq Najee-Ullah (57) ABSTRACT

A device, method, and program product are disclosed which are configured to receive, at a risk analysis engine, one or more business service models from a configuration management database, wherein the one or more business service models each comprises a set of configuration items, and wherein the one or more business service models each indicate a type of configuration item and a connectivity of the configuration item; send the set of configuration items to a vulnerability assessment tool; receive, from the vulnerability assessment tool, one or more vulnerability assessment scores for each configuration item within the set of configuration items; determine an overall business service vulnerability score for each of one or more business services based on the one or more business service models and the vulnerability assessment scores received from the vulnerability assessment tool; and output electronically the overall business service vulnerability score.

19 Claims, 7 Drawing Sheets

(56) References Cited

U.S. PATENT DOCUMENTS

| | | | |
|---|---|---|---|
| 2006/0075503 A1* | 4/2006 | Bunker et al. | 726/25 |
| 2006/0224500 A1* | 10/2006 | Stane et al. | 705/38 |
| 2006/0285665 A1* | 12/2006 | Wasserblat et al. | 379/114.14 |
| 2007/0022025 A1* | 1/2007 | Litman et al. | 705/30 |
| 2007/0087756 A1* | 4/2007 | Hoffberg | 455/450 |
| 2008/0249793 A1* | 10/2008 | Angell et al. | 705/1 |
| 2009/0248753 A1* | 10/2009 | Tsai et al. | 707/202 |
| 2010/0031358 A1* | 2/2010 | Elovici et al. | 726/24 |
| 2010/0114634 A1* | 5/2010 | Christiansen et al. | 705/7 |
| 2012/0254067 A1* | 10/2012 | Litman et al. | 705/36 R |

* cited by examiner

DEVICE, METHOD, AND PROGRAM PRODUCT FOR DETERMINING AN OVERALL BUSINESS SERVICE VULNERABILITY SCORE

FIELD OF THE INVENTION

Various embodiments of the present application relate to scoring and reporting risks of an organization's IT infrastructure. More particularly, various embodiments of the present application relate to a Risk Analysis Engine which scores business services by analyzing and fusing standard vulnerability assessment scores and business service models in order to determine risk scores for various business services.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application, and is not admitted to be prior art by inclusion in this section.

In today's technological environment, the complexity and connectivity between information technology (IT) assets are increasing and changing at a rapid rate. As such, dozens of new system vulnerabilities are found daily on critical and non-critical IT assets. Left undetected or improperly corrected, these vulnerabilities provide an open door for network attacks which can devastate an organization's IT infrastructure.

The present invention is intended to improve risk analysis.

SUMMARY OF THE INVENTION

In accordance with one embodiment, a device for collecting and reporting vulnerabilities is provided. The device comprises: a communication interface configured to: receive one or more business service models from a configuration management database, wherein the one or more business service models each comprises a set of configuration items, and wherein the one or more business service models each indicate a type of configuration item and a connectivity of the configuration item; a computer configured to: send the set of configuration items to a vulnerability assessment tool; receive, from the vulnerability assessment tool, one or more vulnerability assessment scores for each configuration item within the set of configuration items; determine an overall business service vulnerability score for each of one or more business services based on the one or more business service models and the vulnerability assessment scores received from the vulnerability assessment tool; and output electronically the overall business service vulnerability score.

In accordance with another embodiment, a method of collecting and reporting vulnerabilities is provided. The method comprising: receiving, at a risk analysis engine, one or more business service models from a configuration management database, wherein the one or more business service models each comprises a set of configuration items, and wherein the one or more business service models each indicate a type of configuration item and a connectivity of the configuration item; sending the set of configuration items to a vulnerability assessment tool; receiving, from the vulnerability assessment tool, one or more vulnerability assessment scores for each configuration item within the set of configuration items; determining an overall business service vulnerability score for each of one or more business services based on the one or more business service models and the vulnerability assessment scores received from the vulnerability assessment tool; and outputting electronically the overall business service vulnerability score.

In accordance with yet another embodiment, a computer-readable memory for collecting and reporting vulnerabilities is provided. The computer-readable medium, including computer readable instructions which when executed by a processor cause a device to: receive, at a risk analysis engine, one or more business service models from a configuration management database, wherein the one or more business service models each comprises a set of configuration items, and wherein the one or more business service models each indicate a type of configuration item and a connectivity of the configuration item; send the set of configuration items to a vulnerability assessment tool; receive, from the vulnerability assessment tool, one or more vulnerability assessment scores for each configuration item within the set of configuration items; determine an overall business service vulnerability score for each of one or more business services based on the one or more business service models and the vulnerability assessment scores received from the vulnerability assessment tool; and output electronically the overall business service vulnerability score.

These and other features of various embodiments of the present invention, together with the organization and manner of operation thereof, will become apparent from the following detailed description when taken in conjunction with the accompanying drawings, wherein like elements have like numerals throughout the several drawings described below. However, the accompanying drawing of the preferred embodiments of the invention are for explanation and understanding only and should not be taken to be limitative to the invention.

DETAILED DESCRIPTION OF THE PREFERRED EMBODIMENTS

Various embodiments of the present invention relate to a Risk Analysis Engine which enables business management to better understand the IT security environment of an organization. This better understanding enables business management to make more informed or strategic decisions based on the level of vulnerability and the business service associated with the vulnerability.

Figure 1:
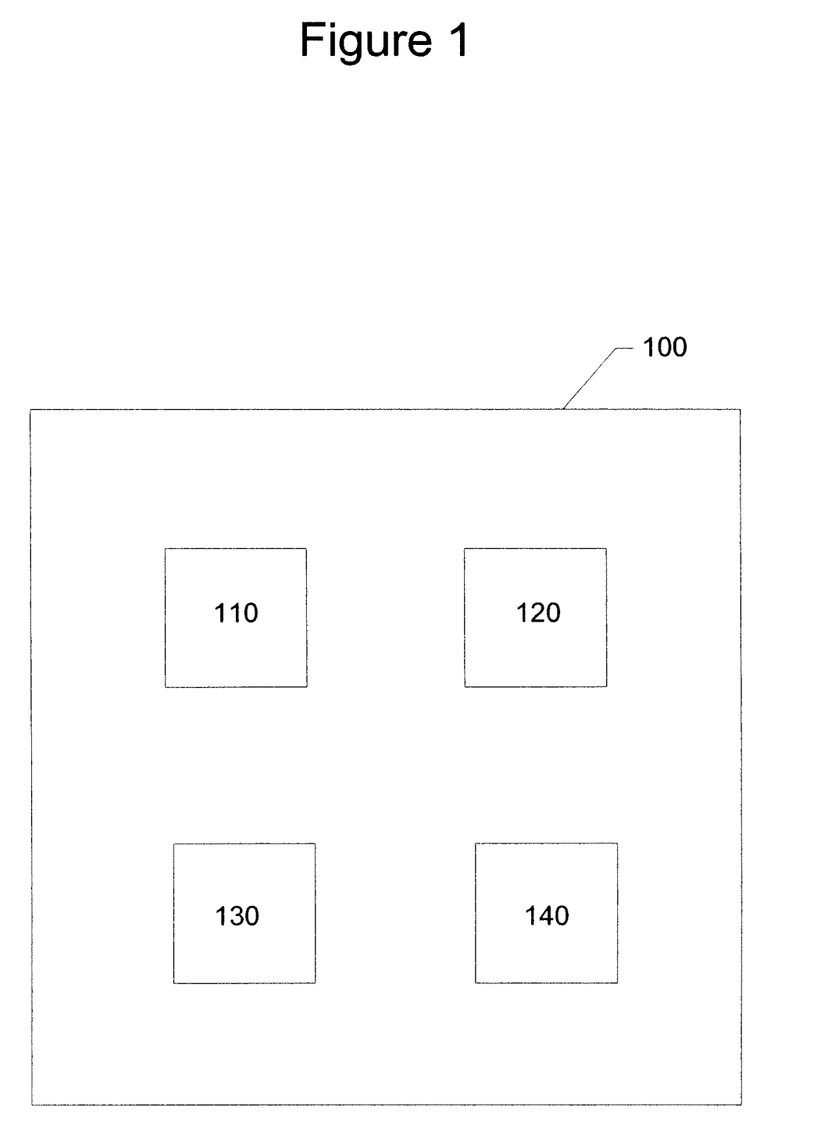
FIG. 1 is an overview diagram of a system within which various embodiments of the present invention may be implemented.

FIG. 1 is an overview diagram of a system within which various embodiments of the Risk Analysis Engine may be implemented. An exemplary system for implementing the Risk Analysis Engine may include a computing device 100 in the form of a computer, including a processing unit 110, a system memory 120, and a system bus that couples various system components including the system memory to the processing unit. The computing device 100 may also include one or more interfaces 130, such as a display, keyboard, or mouse, electronically coupled to an input/output unit 140. The system memory may include removable and non-removable storage devices including, but not limited to, Read Only Memory (ROM), Random Access Memory (RAM), compact discs (CDs), digital versatile discs (DVD), etc.

Embodiments within the scope of the present invention also include computer-readable media, such as memory, for having computer-executable instructions or data structures stored thereon and also known as software. Such computer-readable media can be any available media, which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions. Computer-executable instructions may also be properly termed "software" as known by those of skill in the art.

Figure 2:
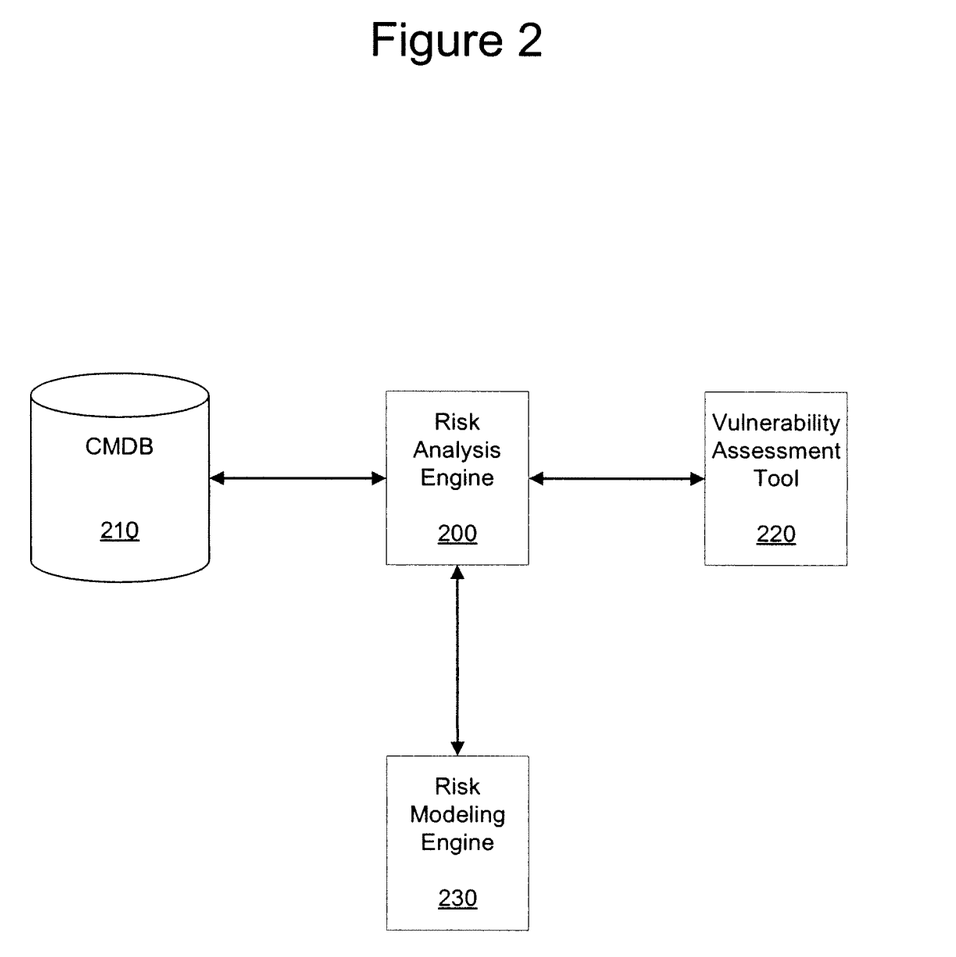
FIG. 2 is a schematic representation of the network elements which may be included in the present invention.

FIG. 2 is a schematic representation of elements which may be included in the present invention. As illustrated, a Risk Analysis Engine 200 is electronically coupled to a configuration management database (CMDB) 210, a Vulnerability Assessment Tool 220, and a Risk Modeling Engine 230. Each of these elements contain one or more interfaces which enable the respective element to send and receive information to/from the other elements within the network or system. It is contemplated that all of these elements may be located in a single computing device or located in separate distinct nodes. Furthermore, some elements, such as the Risk Analysis Engine, 200, Vulnerability Assessment Tool 220 and Risk Modeling Engine 230, may be embodied in a single computing device and communicate with a separate remote CMDB 210.

As described herein, a CMDB 210 is intended to denote a particular type of repository in accordance with the Information Technology Infrastructure Library (ITIL) definition published at the ITIL library. More specifically, the CMDB 210 is configured to store business service models each comprising a set of configuration items (CIs) or IT assets associated with the particular business service. It should be noted that the terms "IT asset" and "CI" or "CIs" are used interchangeably throughout the disclosure and are intended to denote any IT asset of an organization (in accordance with the ITIL definition). A CI may be hardware and/or software. For example, a CI may be a server, computer, software application, router, network connection, private branch exchange (PBX), automatic call distributor (ACD), printer, desktop, telephone, or any other technological asset associated with an organization.

As used herein, the terms "business services model" or "business service" are intended to be in accordance with the ITIL definition of business services, and thereby denote business activities undertaken by an organization in pursuit of a common goal. Typical business services models may include services or business departments such as "operations," "customer service," "marketing," "accounting," and "delivering."

It should be noted that a business service model may include other business services models within itself (i.e., subsets). For example, a business service model related to "online banking" may include three business service models related to "account services," "transferring funds," and "bill payment." Accordingly, business services models may be in a "tree" configuration, wherein a single business service model may include a plurality of other business service models, and wherein each business service model comprises a set of CIs. For example, if the business services model is for "Customer Service," a set of CIs associated with the Customer Service technology infrastructure would be correlated with the business services model for Customer Service.

The Risk Analysis Engine 200 is configured to query the CMDB 210 in order to receive business services models. The query may be a general query requesting all of the business service models stored in the CMDB 210, or may be a specific query requesting specific business services model related to business sectors, a particular organization, etc. For example, a query may comprise a business service name. The CMDB 210 responds to the query with a reply message comprising one or more business services models.

Figure 6:
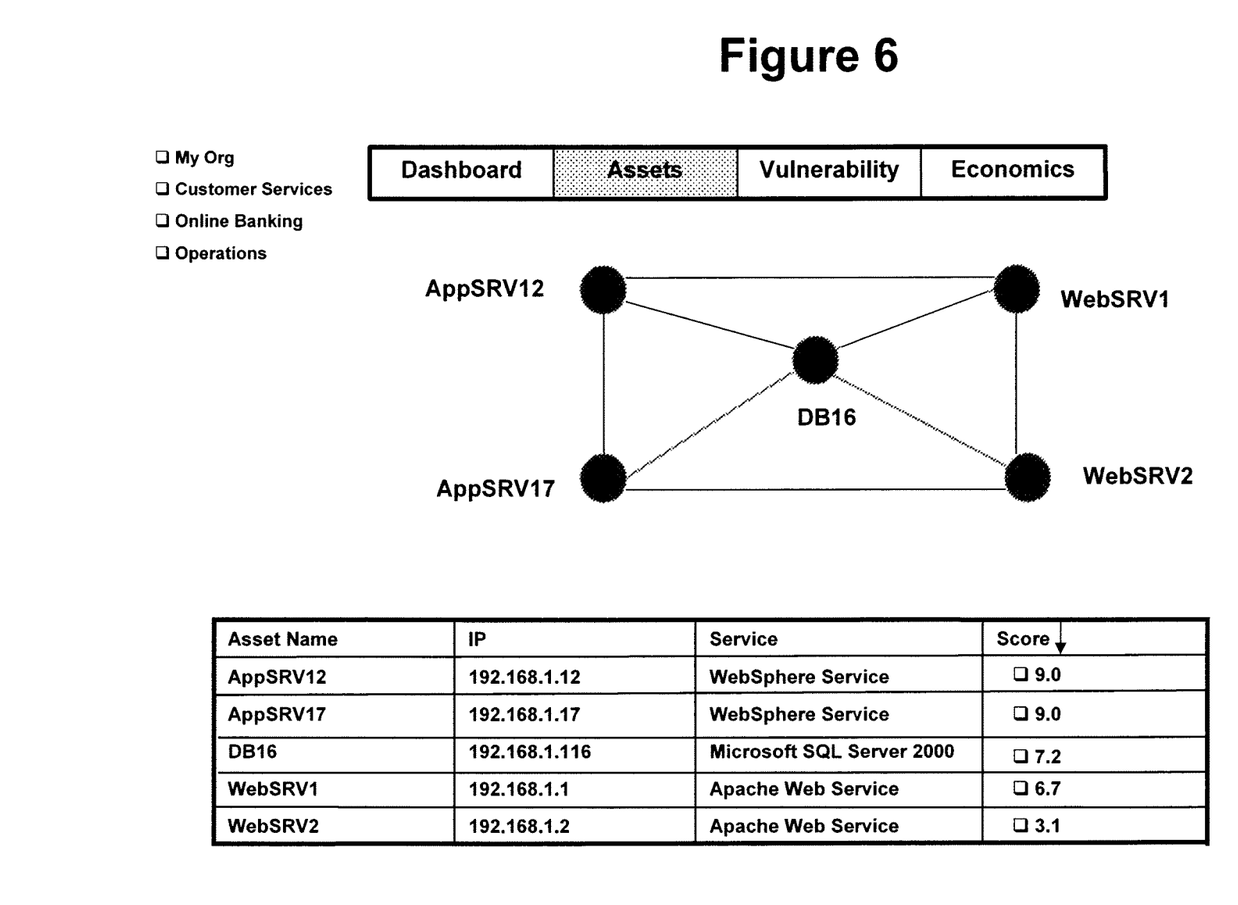
FIG. 6 is an exemplary view of a third exemplary output of the Risk Modeling Engine.

An exemplary graphical representation of a business service model is illustrated in the graphical user interface (GUI) of FIG. 6. As shown, the business service model indicates all of the CIs associated with a particular business service. As further shown, the business service model also depicts all of the connections (logical and physical) between all of the CIs associated with the particular business service. The information depicted in this graphical representation of the business service model may be provided from the CMDB 210 to the Risk Analysis Engine 200 in various forms. For example, the list of CIs and associated relationships may be provided to the Risk Analysis Engine 200 via a XML description or text document.

After the Risk Analysis Engine 200 has received the business service models from the CMDB 210, the Risk Analysis Engine 200 is configured to send one or more sets of CIs (each set associated a business service model) to a Vulnerability Assessment Tool 220 electronically coupled therewith. The Vulnerability Assessment Tool 220 may be a security tool or compliance management tool which assesses risks associated with the one or more CIs. The Vulnerability Assessment Tool 220 is configured to detect all of the vulnerabilities and create a list of list of vulnerabilities for each CI. In addition, the Vulnerability Assessment Tool 220 is configured to determine a score for each vulnerability, thereby creating a vector of scores (e.g., $V_1, V_2, V_3 \ldots V_n$) for each CI. In one embodiment, the score may be based on a Common Vulnerability Scoring System (CVSS). The CVSS is an industry standard for assessing the severity of computer system security vulnerabilities. In other embodiments, the score may be computed using a scoring system which assigns vulnerability scores to IT assets based on a custom or general scoring algorithms.

Once the Vulnerability Assessment Tool 220 has calculated the vector of vulnerability scores (e.g., $V_1, V_2, V_3 \ldots V_n$) for a CI, the Vulnerability Assessment Tool 220 sends a vector of vulnerability scores (CVSS scores) for the CI back to the Risk Analysis Engine 200. The Risk Analysis Engine 200 takes the vector of scores (e.g., $V_1, V_2, V_3 \ldots V_n$) and determines a single vulnerability score ($S_{CIx}$) for the CI. For example, the single vulnerability score ($S_{CIx}$) for a particular CI may be based on the following function: $S_{CIx} = F_1(V_1, V_2, V_3 \ldots V_n)$;

where $S_{CIx}$ is the single vulnerability score for the particular CI, $F_1$ is a function, and $V_1$-$V_n$ are the vector of vulnerability scores for the particular CI received from the Vulnerability Assessment Tool 220. With regard to $F_1$, an exemplary function may be an average function wherein $S_{CIx}$ equals the average of vulnerability scores ($V_1$, $V_2$, $V_3$ ... $V_n$). For example, if there were three vulnerability scores for a particular CI, $S_{CIx}$ would equal the sum of the three vulnerability scores divided by three. However, this function should not be seen as limiting, as other functions may be used to determine the single vulnerability score ($S_{CIx}$) for the particular CI.

Once the single vulnerability score ($S_{CIx}$) is determined for the CI, a weight ($W_{CIx}$) is determined for the CI. The weight ($W_{CIx}$) for each IT asset (CI) may be determined based solely on its technology-type, based solely on its topology-type, or based on a combination of its technology-type and topology-type, to name a few.

If the weight is based solely on the technology type, a weight ($W_{CIx}$) is assigned to the CI based on the type of asset. For example, a "database" may receive a weight of 1.5, a "web server" may receive a weight of 1.0, and a "user computer" may receive a weight of 0.2. It is contemplated that each technology type may have a minimum weight associated with the IT asset (CI) and an administrator can adjust the weights (above the minimum) as desired.

Alternatively, if the weight is based solely on topology-type, the weight ($W_{CIx}$) may be determined based on the number of network connections (logical and/or physical) associated with the IT asset. In other words, a network asset that is more "popular" may receive a higher weight. For example, a frequently accessed server with a plurality of network connections (logical and/or physical) may receive a weight of 1.5, whereas a server with few network connections may receive a weight of 0.5.

Still further, the weight ($W_{CIx}$) may be determined based on both the technology-type and topology-type. In this determination, a weight based on technology-type and another weight based on topology-type are determined. Subsequently, the two weights are combined to form a single weight. In one embodiment, the single weight may be determined by multiplying the topology-type weight by the technology-type weight. Alternatively, an average of the topology-type weight and the technology-type weight may be employed. In addition, other functions/method are contemplated to determine the weight for a particular CI. Therefore, the example provided herein should not be seen as limiting.

The above-discussed process is conducted for each CI received from the Vulnerability Assessment Tool 220. Thus, in one embodiment, based on the vector of scores received, the Risk Analysis Engine 200 determines a single vulnerability score ($S_{CIx}$) and a single weight ($W_{CIx}$) for each CI associated with the business service.

Once Risk Analysis Engine 230 has determined a single vulnerability score ($S_{CIx}$) and a weight ($W_{CIx}$) for each CI, an overall business service vulnerability score ($BS_x$) is determined for the business service associated with the business services model. An exemplary overall business service vulnerability score ($BS_x$) may be determined based on the following function: $BS_x=((S_{CI1}*W_{CI1})+, \ldots, +(S_{CIn}*W_{CIn}))$, where the overall business service vulnerability score ($BS_x$) is based on the sum of each single vulnerability score ($S_{CIx}$) multiplied by its single weight ($W_{CIx}$). However, this algorithm should not be seen as limiting, as other functions may be used to determine the overall business service vulnerability score.

The above-discussed process is conducted for each business service model. Once an overall business service vulnerability score is determined for each business service model, this information is sent to a Risk Modeling Engine 230, which is electronically coupled to the Risk Analysis Engine 200. Details with regard to the Risk Modeling Engine are discussed in detail below with reference to FIGS. 4-7.

Figure 3:
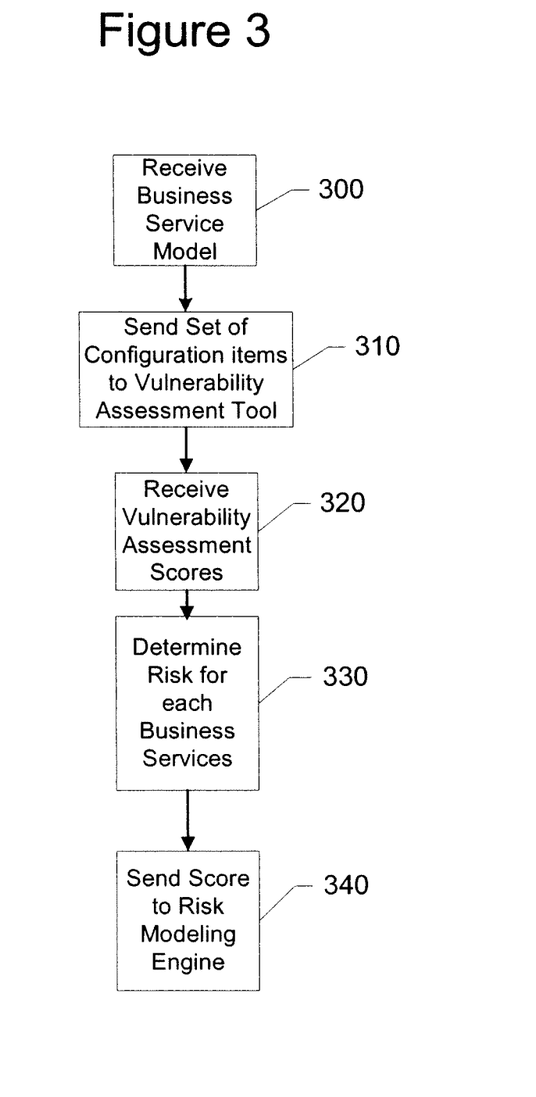
FIG. 3 is a flow chart illustrating processes performed in accordance with various embodiments from the perspective of the Risk Analysis Engine depicted in FIG. 2.

FIG. 3 is a simplified flow chart illustrating processes performed by the Risk Analysis Engine. At 300, the Risk Analysis Engine receives one or more business service models from one or more CMDBs. For example, the Risk Analysis Engine may receive a business service model for "operations," "online banking," and "customer service." Each business service model comprises a set of CIs. In addition, each business services model indicates a relationship between the various CIs within the set of CIs. As used herein, the term relationship is used to denote physical and/or logical relationships between the CIs.

At 310, the Risk Analysis Engine sends each set of configuration items (CIs) to the Vulnerability Assessment Tool 220. As discussed above, the Vulnerability Assessment Tool provides one or more CVSS scores for each CI. After computing the scores, the Vulnerability Assessment Tool sends the scores back to the Risk Analysis Engine. There will generally be a plurality of scores in the form of a vector sent from the Vulnerability Assessment Tool to the Risk Analysis Engine for each CI.

At 320, the Risk Analysis Engine receives the vector of scores for each CI from the Vulnerability Assessment Tool. At 330, the Risk Analysis Engine determines an overall business service vulnerability score for each business service model based on the above-discussed algorithms.

At 340, the Risk Analysis Engine transmits the business service scores to the Risk Modeling Engine 230.

Figure 4:
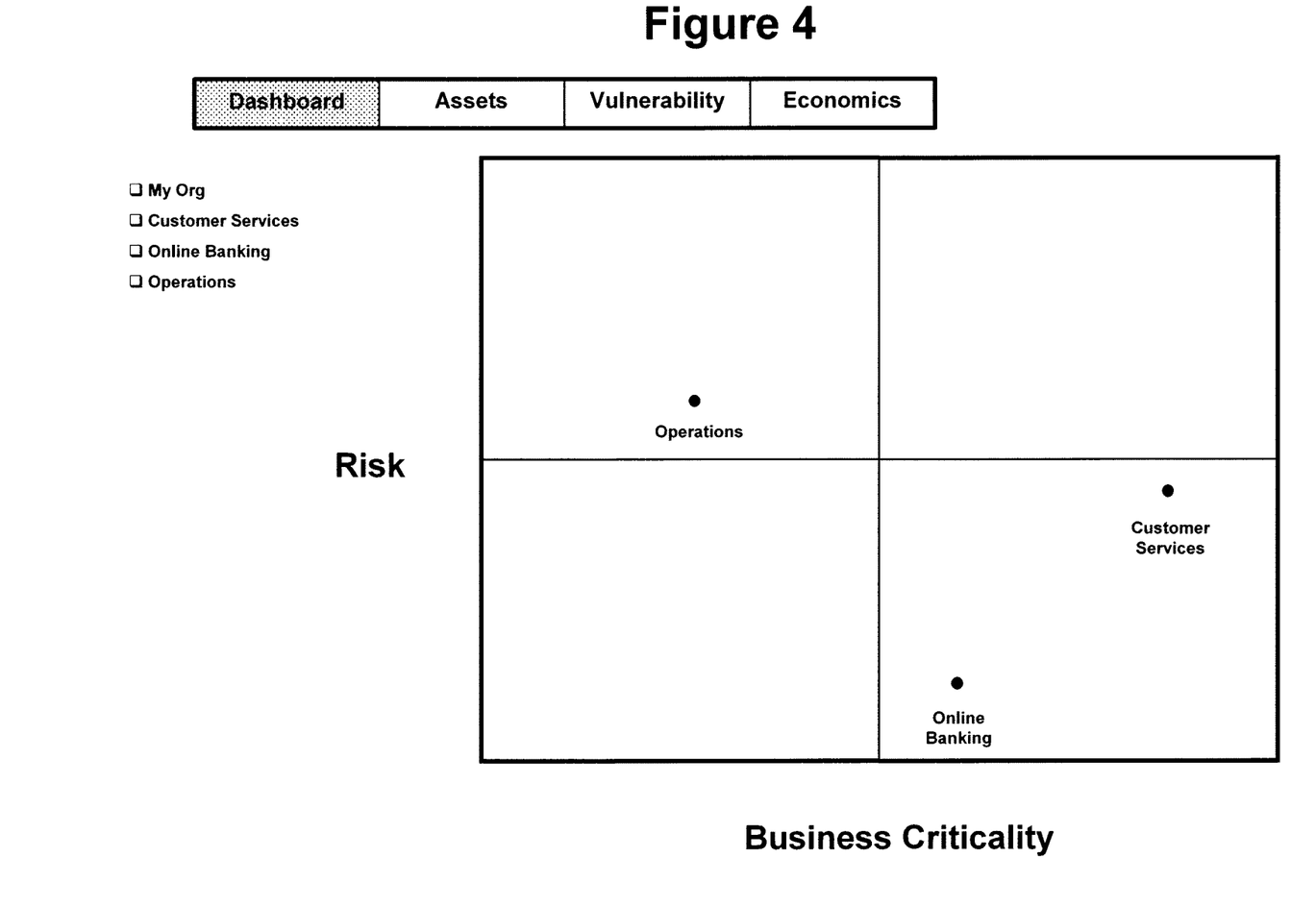
FIG. 4 is a view of a first exemplary output of the Risk Modeling Engine depicted in FIG. 2.

As illustrated in FIG. 4, the Risk Modeling Engine is configured to model the score in a simple and intuitive manner (so that business management can readily comprehend the vulnerabilities with respect to various business services). As depicted in the upper left hand corner of FIG. 4, a list of business services is provided. In this example, the business service are "Customer Service," "Online Banking," and "Operations." The business services are displayed on a simple graph comprising a Risk-axis and a Business Criticality-axis. Risk, as determined from the scores, increases as the identifier representing the business service increases with respect to the Risk-axis. Business Criticality increases as the identifier representing the business service increase with respect to the Business Criticality-axis. As such, the GUI enables a person not skilled in technology to easily grasp the risk vs. criticality associated with various business services. For example, a business manager viewing the GUI of FIG. 4 could readily understand that the "Customer Service" business service is at a medium risk and is extremely critical to the organization. The business manager could also understand that "Operations" is at a higher risk than "Customer Service," but is of less criticality to the organization. Thus, the business manager may decide to provide funds to repair/improve the "Customer Service" infrastructure before allocating funds on "Operations" infrastructure.

It should be noted that the graphs depicted in FIGS. 4-7 are for exemplary purposes only, and should not be seen as limiting. It is contemplated that various other GUI configurations may be provided to display the risk and business criticality in other simple and intuitive manners.

Figure 5:
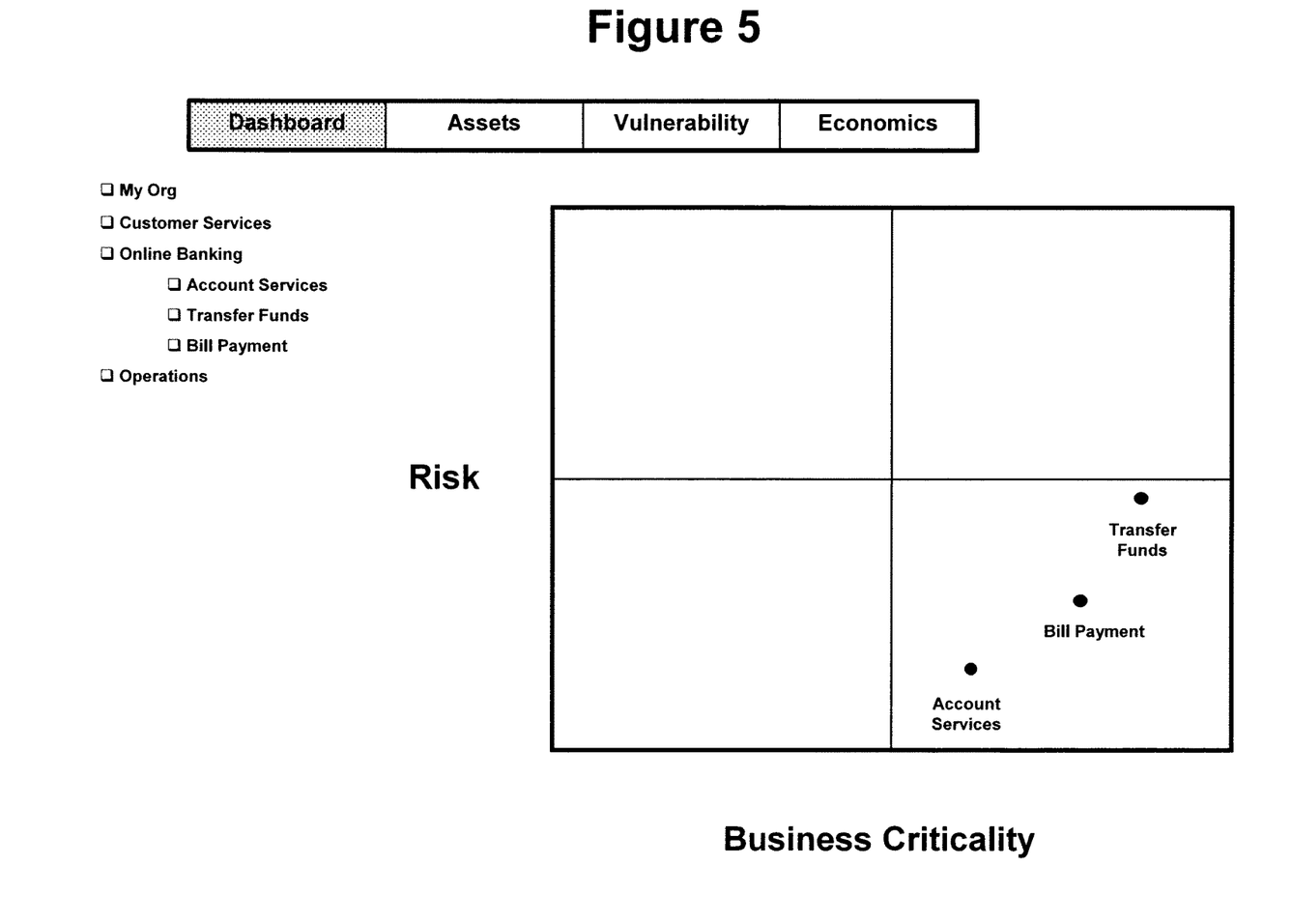
FIG. 5 is a view of a second exemplary output of the Risk Modeling Engine.

FIG. 5 is similar to FIG. 4 except that the business services displayed are subsets of another business service. As illustrated in the top left hand corner of the GUI, the "Online Banking" business service includes "Account Services," "Transfer Funds," and "Bill Payments." As such, a business manager is able to determine which business services within the "Online Banking" business service are the most critical and also the most at risk.

FIG. 6 illustrates a topology view for a specific business service. This view enables a user to view the asset name, the IP address, the service, and a calculated risk score (on an asset by asset basis). In addition, this view depicts the connectivity between the various CIs.

Figure 7:
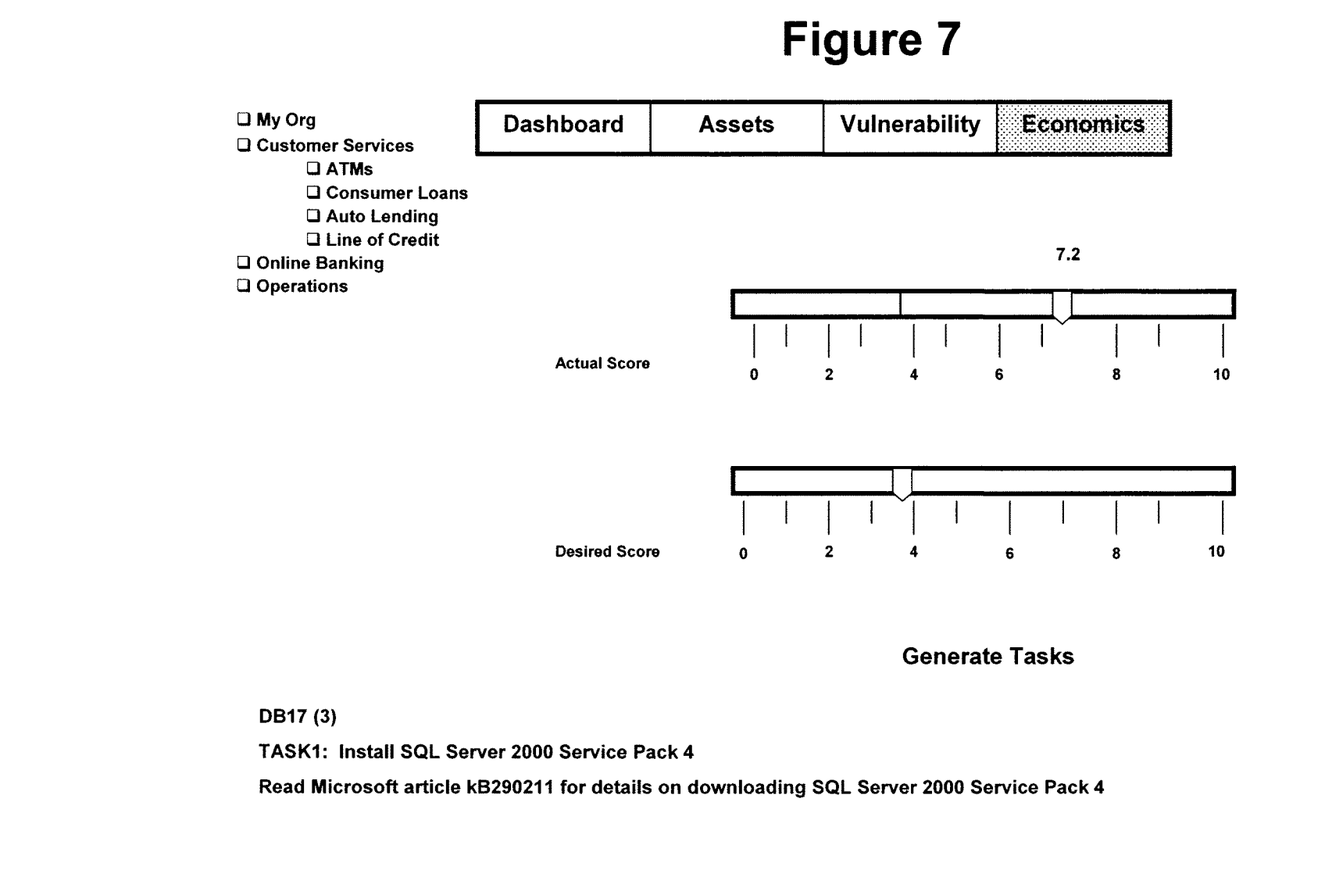
FIG. 7 is a view of a fourth exemplary output of the Risk Modeling Engine.

FIG. 7 illustrates an "economics" view of a specific business service. This view shows the task for every CI in order to decrease the risk to a desired level. For example, if a CI's actual vulnerability score is 7.2, and the user desires the score to be a 3.8, the "economics" view indicates which tasks need to be conducted in order to lower the risk from a 7.2 to a 3.8. For instance, the "TASK1" field in FIG. 7 indicates that the vulnerability score will be reduced from a 7.2 to a 3.8 if "SQL Server 2000 Service Pack 4" is installed in DB17, wherein DB17 is a CI within the "Auto Lending" business service. In addition, "TASK1" provides help or instructions on how to download this product by stating: "Read Microsoft article KB290211 for details on downloading SQL Server 2000 Service Pack 4."

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

It should be also be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention.

What is claimed is:

1. A device comprising:
   a communication interface 130 configured to:
   receive one or more business service models from a configuration management database 210, wherein the one or more business service models each comprises a set of configuration items wherein the configuration items comprise IT assets, and wherein the one or more business service models each indicate a type of configuration item and a connectivity of the configuration item;
   a computer configured to:
   send the set of configuration items to a vulnerability assessment tool 220;
   receive, a vulnerability score for each configuration item within the set of configuration items;
   determine an overall business service vulnerability score for each of one or more business services based on the one or more business service models and the vulnerability scores; wherein determining the overall business service vulnerability score comprises generating a weight based on a technology type and a topology type of each configuration item, and summing the product of the vulnerability score and a weight for each configuration item over all configuration items; and
   output electronically the overall business service vulnerability score.

2. The device of claim 1, further comprising:
   outputting electronically the overall business service vulnerability score for each of the one or more business services to a Risk Modeling Engine 230.

3. The device of claim 1, wherein the device is configured to calculate a single vulnerability score for each configuration item based on the one or more vulnerability assessment scores received from the vulnerability assessment tool.

4. The device of claim 1, wherein the device is configured to determine an overall business service vulnerability score based on a plurality of the business service models by determining a weight for each configuration item.

5. The device of claim 4, wherein determining the weight for each configuration item comprises determining the weight based on type of technology associated with the configuration item.

6. The device of claim 4, wherein determining the weight for each configuration item comprises determining the weight based on logical or physical connectivity of a configuration item.

7. The device of claim 1, wherein the overall business service vulnerability score is determined based on a weight determined from the one or more business service models and a single vulnerability score determined for each configuration item.

8. A method comprising:
   receiving, at a risk analysis engine 200, one or more business service models from a configuration management database 210, wherein the one or more business service models each comprises a set of configuration items, and wherein the one or more business service models each indicate a type of configuration item and a connectivity of the configuration item, wherein the configuration items comprise IT assets;
   sending the set of configuration items to a vulnerability assessment tool 220;
   receiving, a vulnerability score for each configuration item within the set of configuration items;
   determining an overall business service vulnerability score for each of one or more business services based on the one or more business service models and the assessment, by generating the weight based on a technology type and a topology type for each configuration item in a business service model and by summing the product of the vulnerability score and a weight over all configuration items; and
   outputting electronically the overall business service vulnerability score.

9. The method of claim 8, further comprising:
   outputting electronically the overall business service vulnerability score for each of the one or more business services to a Risk Modeling Engine 230.

10. The method of claim 8, further comprising calculating a single vulnerability score for each configuration item based on the one or more vulnerability assessment scores received from the vulnerability assessment tool 220.

11. The method of claim 8, wherein determining an overall business service vulnerability score based on the one or more business service models comprises determining a weight for each configuration item.

12. The method of claim 11, wherein determining the weight for each configuration item comprises determining the weight based on type of technology associated with the configuration item.

13. The method of claim 11, wherein determining the weight for each configuration item comprises determining the weight based on logical or physical connectivity of a configuration item.

14. The method of claim 8, wherein the overall business service vulnerability score is determined based on a weight determined from the one or more business service models and a single vulnerability score determined for each configuration item.

15. A method comprising:
receiving, at a risk analysis engine, a business service model from a configuration management database, wherein the business service model comprises a set of configuration items, wherein the configuration items comprise IT assets, and wherein the business service model indicates a type of each configuration item and a connectivity of each configuration item;
sending the set of configuration items to a vulnerability assessment tool;
receiving, from the vulnerability assessment tool, a vector of vulnerability scores $(V_1, V_2, V_3 \ldots V_n)$ for each configuration item within the set of configuration items;
calculating, at the risk analysis engine, a vulnerability score $(S_{CIx})$ for each configuration item,
determining a weight $(W_{CIx})$ for each configuration item by generating the weight $(W_{CIx})$ based on a technology type and a topology type of the configuration item;
calculating an overall business service vulnerability score by summing the product of the vulnerability score and a weight over all configuration items; and
outputting electronically the overall business service vulnerability score to a risk modeling engine.

16. The method of claim 15, wherein the vulnerability score is defined by $S_{CIx}=F_1(V_1, V_2, V_3 \ldots V_n)$, where $F_1$ is a function for combining the individual values in the vector of vulnerability scores, x is a number of configuration items in the set, and n is a number of vulnerability scores.

17. The method of claim 1, wherein the overall business service vulnerability score is calculated by $BS=((S_{CI1}*W_{CI1})+, \ldots, +(S_{CIX}*W_{CIX}))$, where BS is the overall business service vulnerability score.

18. The method of claim 15, further comprising: determining a business criticality value for the business service; and
graphically displaying the overall business service vulnerability verses the business criticality value for the business service.

19. The method of claim 15, further comprising listing tasks to be taken to lower the vulnerability score of a configuration item from an actual vulnerability score to a target vulnerability score.

* * * * *

UNITED STATES PATENT AND TRADEMARK OFFICE
CERTIFICATE OF CORRECTION

PATENT NO. : 8,533,843 B2  Page 1 of 1
APPLICATION NO. : 12/250199
DATED : September 10, 2013
INVENTOR(S) : Eliav Levi

It is certified that error appears in the above-identified patent and that said Letters Patent is hereby corrected as shown below:

In the Claims:

In column 10, line 7, in Claim 16, delete "$S_{CIX}=$" and insert -- $S_{CIx}=$ --, therefor.

In column 10, line 14, in Claim 17, delete "$(S_{CIX},*W_{CIX}))$," and insert -- $(S_{CIx}*W_{CIx}))$, -- , therefor.

Signed and Sealed this
Third Day of June, 2014

Michelle K. Lee
*Deputy Director of the United States Patent and Trademark Office*